UNITED STATES PATENT OFFICE.

WILLIAM F. GRIER, OF LONDON, ENGLAND.

PRESERVATIVE FOR ORGANIC SUBSTANCES AND PROCESS OF MAKING THE SAME.

SPECIFICATION forming part of Letters Patent No. 268,094, dated November 28, 1882.

Application filed September 6, 1882. (No specimens.)

*To all whom it may concern:*

Be it known that I, WILLIAM F. GRIER, of London, England, Kingdom of Great Britain, have invented certain Improvements in Preservatives for Organic Substances and a Process of Making the Same; and I hereby declare the following to be a full, clear, and exact description thereof, sufficient to enable one skilled in the art to practice my invention.

My invention relates to a preservative for food and all other organic substances, and has for its object to provide a preservative which is easily and conveniently handled and transported, being a dry substance in impalpable power, without the slightest tendency to change in itself in any climate or weather, while wholly lacking in bad or unwholesome results on the human economy, and having in the highest degree antiseptic or preservative properties.

My invention consists, first, in a process of making a preservative, hereinafter described, and in a novel preservative for organic substances, as hereinafter fully described, and specifically pointed out in the claims.

I take eleven hundred and sixteen parts, by weight, of boracic acid ($H_3BO_3$) and three hundred and eighty-two, by weight, of prismatic borax, ($Na_2B_4O_7+10H_2O$,) both of which I previously purify by recrystallization. I grind them into an impalpable powder and then mix them intimately together. Having done this, I subject these powders, on trays or otherwise, to a temperature of about 212° Fahrenheit. At the expiration of from ten to fifteen minutes chemical action takes place between the two substances, the molecules rearrange themselves, and water is evolved to such an extent that the previously perfectly dry powders become absolutely wet. I then remove the superfluous moisture by passing over the powders a current of dry hot air, which has the effect of carrying off the water in a state of vapor, and leaves the new mixture in the condition of a dry granular powder, very convenient for packing and remarkably handy for use in its various applications. On weighing the resultant compound it will be found that one-half of the water ($H_2O$) of crystallization of the borax ($Na_2B_4O_7$) has disappeared and one-third of that of the boracic acid, ($H_3BO_3$.) The amount of water evolved amounts to nearly one-third of the total weight.

Each of the elements entering into the formation of a chemical compound has a definite atomic weight, and it will be found that the sum of the atomic weights of the elements forming the boracic acid amounts to sixty-two, and that of the prismatic borax three hundred and eighty-two. Now, as the chemical combination of compounds takes place only in the proportion of the sums of the atomic weights of these compounds or multiples of them, I take a multiple (eighteen) of the molecular weight of boracic acid and the unit molecular weight of the compound prismatic borax and treat them as before specified. The reaction that takes place may be represented as follows: $18H_3BO_3 + Na_2B_4O_7 10H_2O = (9B_2O_3 9H_2O)(Na_2O 2B_2O_3 5H_2O) + 23H_2O$.

The borate salt thus obtained is in a form readily transportable and in a convenient condition of fine division to be rubbed on the article to be preserved. Its antiseptic properties are very great, and among a great variety of purposes for which it is useful it will be found particularly serviceable in preventing mold and mildew in tobacco manufacture.

If found desirable, this preservative I have described may be mixed with other antiseptics and used.

Having thus described my invention, what I claim as new, and desire to secure by Letters Patent, is—

1. The hereinbefore-described process of obtaining a food-preservative, consisting essentially in heating together eleven hundred and sixteen parts, by weight, of boracic acid and three hundred and eighty-two parts of prismatic borax in a finely-divided condition and intimately commingled until the evolution of water has fully taken place, and then drying off the evolved water by means of a current of dry hot air, substantially as set forth.

2. As a preservative for food and organic substances, the product of the hereinbefore-described process of treating boric acid and borax.

WILLIAM F. GRIER.

Witnesses:
R. K. EVANS,
H. B. APPLEWHAITE.